Patented Feb. 12, 1935

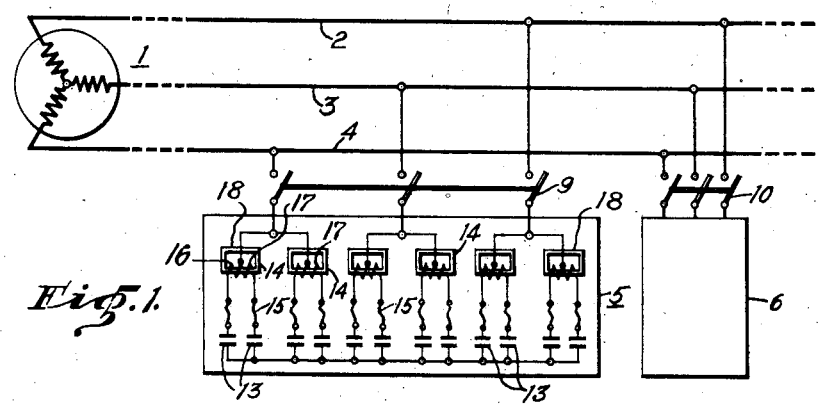
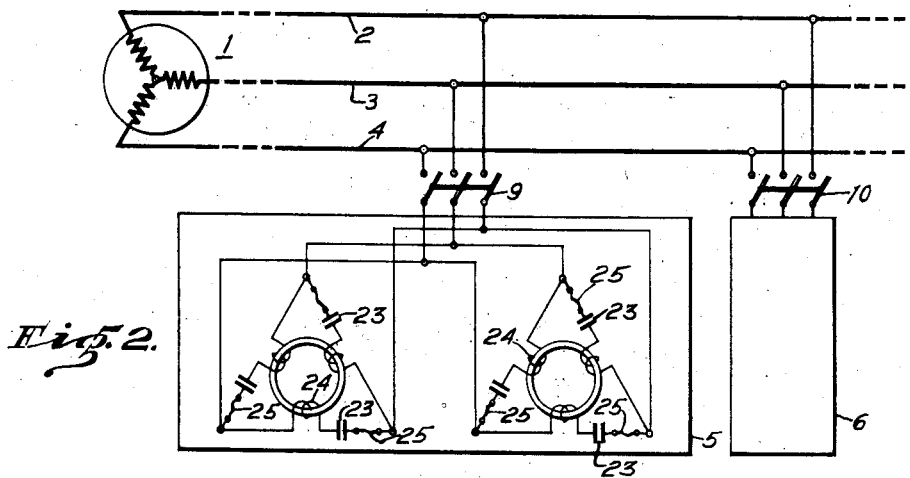
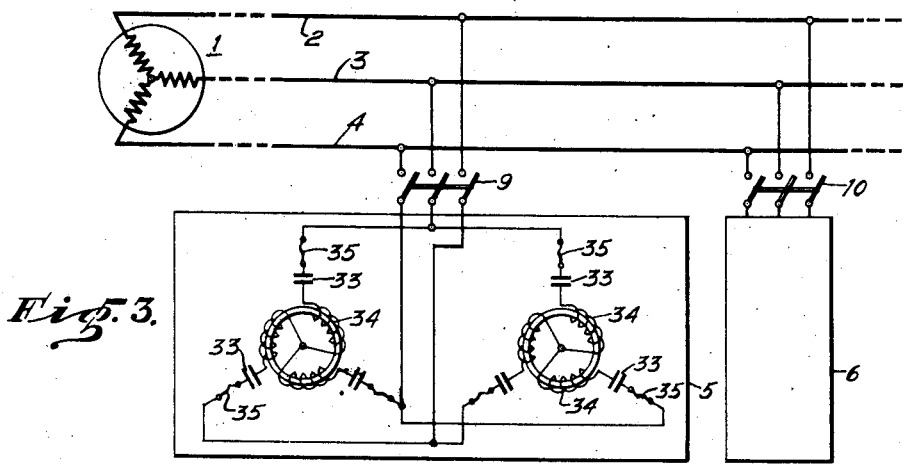

1,991,063

UNITED STATES PATENT OFFICE 1,991,063

SELF CLEARING FUSED SECTIONALIZED CAPACITOR

Reinhold Rüdenberg, Berlin-Grunewald, Germany, assignor to Westinghouse Electric & Manufacturing Company, East Pittsburgh, Pa., a corporation of Pennsylvania Application May 25, 1932, Serial No. 613,411
In Germany June 2, 1931

13 Claims. (Cl. 172—246)

This invention relates to static condensers or capacitor units for power-factor correction, or for improving the voltage characteristics or both, of commercial power lines.

A very distinctive feature of static condensers or capacitors for power-factor correction on commercial lines, as such corrections were attempted to be made prior to my present invention, has been their high short-circuit-current capacity. Their short-circuit current has been so large that the prior-art capacitors could be used for percussive welding, by connecting a capacitor momentarily to a direct-current line, thereby storing energy in the capacitor or condenser, and subsequently short-circuiting it through the joint to be welded.

One of the great advantages of capacitors utilized for power-factor correction or the correction of the voltage characteristics of an alternating-current transmission line has been their high efficiency and relatively very low losses. Most manufacturers can keep the loss considerably below 6 watts per KVA.

The high short-circuit current of a capacitor unit is a very distinct disadvantage, when it is used to improve the voltage characteristics or for power-factor correction of a transmission line, because it necessitates the employment of very costly and unreliable high-duty fuses and breakers. This disadvantage is particularly costly and dangerous when capacitors are utilized in large banks for power-factor correction. Such banks are nearly always larger than 60 KVA, and often run into thousands of KVA capacity. The short-circuit energy of such a bank of capacitors is something tremendous and thus presents a serious problem in the design of such installations.

With the installations of the prior art it thus frequently happens that the fuse associated with each condenser element breaks down with an explosive effect, thus damaging adjacent sound elements. Furthermore, the heavy current surge produces voltage peaks that may cause other elements to break down when one condenser element fails.

It is an object of my invention to obviate the disadvantages heretofore pointed out for capacitor units without impairing the efficiency and low loss of such units.

Another object of my invention is to utilize choke coils or reactors in combination with condenser elements so connected that there is substantially no reactance in the whole capacitor unit during normal operation, but wherein the reactance increases very materially when one or more elements fail, whereby the current surge as the result of the failure of a condenser unit is very much decreased.

Another object of my invention is to provide a capacitor which will never fail as a unit but will merely, as small elements thereof fail, shrink in capacity as time goes on.

A still further object of my invention is to prevent failure of more than one condenser element of a capacitor unit at a time.

It is also an object of my invention to prevent explosive fuse rupture of the fuses utilized with each condenser element of a capacitor unit.

Other objects and advantages will become more apparent from a study of the following specification when considered in conjunction with the accompanying drawings, in which:

Figure 1 is a diagrammatic showing of a plurality of capacitor units, but wherein one unit is shown in diagrammatic detail;

Figs. 2 and 3 are diagrammatic showings of two other modifications of my invention;

Figure 4:
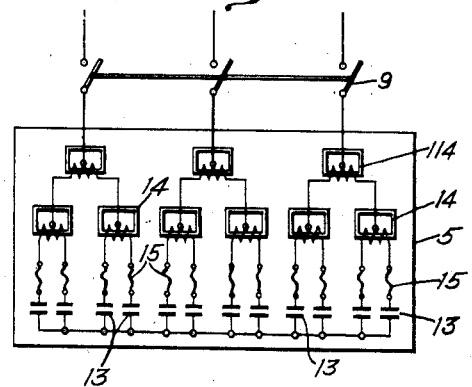
Fig. 4 is a diagrammatic showing of a single capacitor unit such as are shown in Figs. 1, 2 and 3, except that an additional reactor is shown with each four condenser elements

Referring more particularly to Fig. 1, an alternating-current generator 1 is shown, which usually supplies alternating-current of commercial voltage and frequency to the network 2, 3 and 4. The invention is not, however, limited to a network or power system of standard frequency and commercial voltage, although the utility of my invention is very materially enhanced in a commercial system.

A plurality of capacitor units, or compensating units, such as 5, 6, etc. are connected at various points to the network by a plurality of circuit breakers or switches 9, 10, etc. These units correct the power-factor or improve the voltage characteristics, or both, of the network or power system in a well-known manner. The number of units needed or desired is, of course, determined by the character of the respective loads on the system, the size of the system, and other factors. The choke coils utilized with each capacitor unit such as 5, 6, etc. are not shown for the sake of simplicity.

Each capacitor unit consists of twelve, sixteen, twenty-four, thirty-two or even more parallelly-connected condenser elements 13, each pair of which is connected across a reactor or choke coil 14. Between each partial condenser or element 13, or a number of elements grouped, and each choke coil, is disposed a fuse 15. The respective coils of the reactors 14 are tapped at their midpoints for symmetrical connection to the supply conductors or network 2, 3 and 4.

What I mean by grouping and connecting a reactor between each group is the positioning of reactors between the first pair and the second pair, the third pair and the fourth pair, and also the placing of a reactor between the first four and the second four, and so on.

For each phase, as shown in Fig. 1, two minor units, each composed of a reactor 14, and two series-connected condenser elements 13 and fuses 15 are connected in parallel.

For the circuit connections shown, no choking action of the reactors 14 can occur during normal operation. If, however, one of the partial condensers or elements 13 fails, i. e., is short-circuited, the condenser elements 13 not short-circuited and, as shown, connected in parallel with the one that may have failed, can discharge only slowly because of the impeding action of the choke coil.

To better understand the useful and novel effect of the choke coils, let it be assumed that none of the elements 13 have failed. As the normal alternating-current surges flow in conductors 2, 3 and 4, the unit 5 will draw a leading current from 4, considering only one phase and one pair of elements, through the left-hand blade of circuit interrupter 9, through coils 16 and 17 to the condenser elements. Since the current in coils 16 and 17 flows in opposite directions on the iron core 18, no change of flux is produced in the iron core with the result that the reactance remains negligible. If one of the elements 13 fails, the discharge current, from the sound element 13 and the short-circuit current of the line, not only flows through coils 16 and 17 in the same direction with reference to the iron core, but tends to flow with a much greater rate of change because discharge oscillations are well known to proceed at a very great rate of change. The combined action of coils 16 and 17 thus prevents excessive discharge currents.

Fig. 2, representing another modification of my invention, shows each minor unit as consisting of three condenser elements connected in delta circuit relation. Each portion or side of the delta arrangement has a condenser element 23, one coil of a reactor 24, and a fuse 25 all connected in series. The remaining elements of the modification shown in Fig. 2 bear the same reference characters as the corresponding elements shown in Fig. 1.

It will be noted that with the arrangement shown in Fig. 2, the reactor coils neutralize each other, and particularly since the coils are connected in series with the respective condenser elements, the reactance of the reactor is substantially zero during normal operation. If, however, one of the condenser elements fails, the other condenser elements discharge through the short-circuited element, but the reactance of the reactor prevents excessive currents which might damage the sound elements.

The modification shown in Fig. 3 is similar to the modification shown in Fig. 2, except that the condenser elements 33, the coil of the reactor 34, and fuse 35, all connected in series, constitute the arms of a Y-connection for each minor unit. When an element in this arrangement fails, the remaining sound elemets discharge through the short-circuited element, but the current surge is kept within safe limits by the reactors 34.

In the modification illustrated in Fig. 4 a single capacitor unit 5 is illustrated having the individual condenser elements 13 interconnected with fuses 15 and reactors 14 as condenser elements 13 in Fig. 1, but each group of four elements is interconnected with an additional reactor 114. From this arrangement it is obvious that in case of a failure of a pair of parallelly connected condenser elements at the same time the current surge would nevertheless be kept low by the reactor 114.

Figure 5:
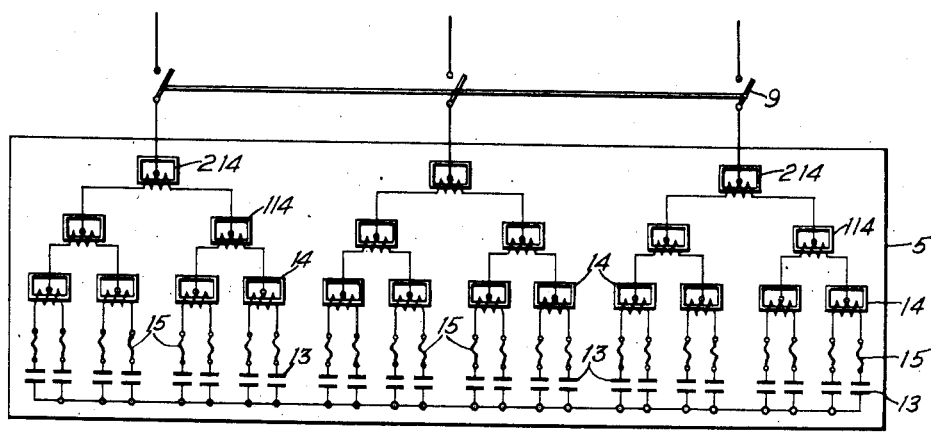
Fig. 5 is a diagrammatic showing of a modification of a single capacitor unit, utilizing additional reactors with groups of four and eight condenser elements.

The modification shown in Fig. 5 merely carries the showing in Fig. 4 one step further, i. e., each group of eight elements 13 is provided with reactor 214. Similarly, groups of twelve, sixteen, twenty-four, etc. The reactors 114 (Fig. 4) and 214 provide an additional safety factor but are not absolutely essential. The arrangements shown in Figs. 1, 2 and 3 being sufficient and safe for most installations.

My invention may be applied not only to the capacitor units utilized to regulate the voltage on long transmission lines, but it may, in general, be utilized in all cases where capacitor units are built up of a plurality of condenser elements for improving the power-factor of the alternating-current energy transmitted.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. A plurality of capacitor units, for a power line supplying alternating-current of commercial voltage and frequency, for improving electrical characteristics of the power line, each of said units including a plurality of capacitors connected in parallel, a fuse in series with each capacitor, and a reactor interconnected with each pair of capacitors to prevent excessive discharge currents upon the failure of one of the capacitors of the two capacitors with which the reactor is interconnected.

2. A capacitor unit, for a power line supplying alternating-current to electrical devices having a plurality of non-separable parallel sections, with individual fuses for each section, and reactors interconnected with the sections to prevent excessive discharge currents from the sound sections upon the failure of any one or several of said sections.

3. A capacitor unit, for a power line supplying alternating-current to consumers, having a plurality of parallel sections, a fuse for each section, and reactors having coils connected in closed series circuit with each pair of sections.

4. A capacitor unit, interconnected with an alternating-current power line, for improving the operating characteristics of said line, said unit including an even number of condenser elements all connected in parallel, a fuse for each condenser element adapted to rupture the circuit connections of the condenser element upon the failure of the element with which the fuse is connected, and a reactor interconnected with each pair of elements to prevent excessive discharge currents upon the failure of one condenser element.

5. A capacitor unit for improving the electrical characteristics of the power transmitted by a power line, said unit comprising a plurality of condenser elements connected in parallel, a choke coil interconnected with each pair of said elements and the power line, said coil being so connected that there will be no reactance during normal operation, but whenever there is a partial failure in the unit, the exchange of energy between the parallel elements is impeded.

6. A plurality of capacitor units in combination with a power line for improving the electrical characteristics of the power transmitted by the power line, each of said units comprising a plurality of grouped condenser elements connected in parallel, a choke coil interconnected with each pair of elements, a second choke coil interconnected with each four elements, said coils being so connected that there will be no reactance during normal operation, but whenever there is a failure of some elements the exchange of energy between elements and groups of elements is impeded.

7. A plurality of capacitor units for a power line supplying alternating-current, said units being disposed to improve the electrical characteristics of the electrical energy being supplied, each of said units including a plurality of minor units connected in parallel circuit relation, each of said minor units comprising a group of three condenser elements, reactor coils and fuses connected in delta circuit relation with one element, one fuse, and one coil all connected in series as one side of the delta arrangement.

8. In a capacitor unit composed of a large number of minor units connected in parallel, each minor unit comprising electrical devices connected in delta, each side of the delta connection including a condenser element, a fuse, and a reactor coil connected in series.

9. In a capacitor unit composed of a large number of minor units connected in parallel, each minor unit comprising electrical devices connected in Y circuit relation, each arm of the Y including a condenser element, a fuse, and a reactor coil connected in series.

10. A plurality of capacitor units for a power line supplying alternating-current energy, said units being designed and connected to improve the electrical characteristics of the energy being supplied, each of said units including a plurality of minor units connected in parallel circuit relation, each of said minor units comprising a group of three condenser elements, reactor coils, and fuses connected in Y circuit relation with one condenser element, one fuse, and one coil all connected in series to constitute an arm of the Y connection.

11. A capacitor unit for improving the electrical characteristics of the power transmitted by a power line, said unit comprising a plurality of condenser elements connected in two or more parallelly connected groups each group comprising a delta circuit arrangement having a condenser element, a fuse, and a reactor coil of a three-phase delta-connected reactor connected in series in each side of said delta circuit arrangement.

12. A capacitor unit for improving the electrical characteristics of the power transmitted by a power line, said unit comprising a plurality of condenser elements connected in two or more parallelly connected groups, each group comprising a Y circuit arrangement having a condenser element, a fuse, and a reactor coil of a three-phase Y-connected reactor connected in series in each leg of said Y circuit arrangement.

13. A plurality of capacitor units in combination with a power line for improving the electrical characteristics of the power transmitted by the power line, each of said units comprising a plurality of grouped condenser elements connected in parallel, a choke coil for each pair of elements having its ends connected to corresponding terminals of the respective pair of elements, a second choke coil having its ends connected respectively, to the mid-points of each two of said first named choke coils, means for interconnecting the mid-points of said last named coils with said power line, and means for interconnecting all the other corresponding terminals of said elements to said power line.

REINHOLD RÜDENBERG.